Dec. 5, 1967    R. A. SCHOLTEN    3,356,876
SYNCHRONOUS MOTOR

Filed April 5, 1960    4 Sheets-Sheet 1

Inventor
Richard A. Scholten

By Hill, Sherman, Meroni, Gross & Simpson
Attys

Dec. 5, 1967  R. A. SCHOLTEN  3,356,876
SYNCHRONOUS MOTOR
Filed April 5, 1960  4 Sheets-Sheet 2
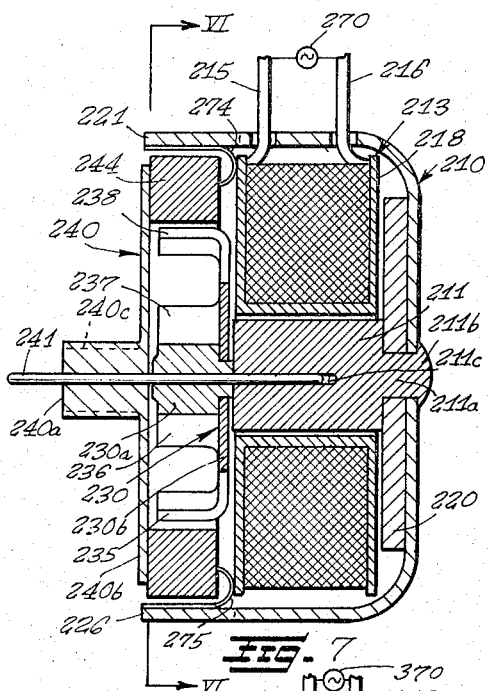
Inventor
Richard A. Scholten
By Hill, Sherman, Meroni, Gross & Simpson Attys Dec. 5, 1967   R. A. SCHOLTEN   3,356,876
SYNCHRONOUS MOTOR
Filed April 5, 1960   4 Sheets-Sheet 3

Inventor
Richard A. Scholten
By Hill, Sherman, Meroni, Gross & Simpson   Attys

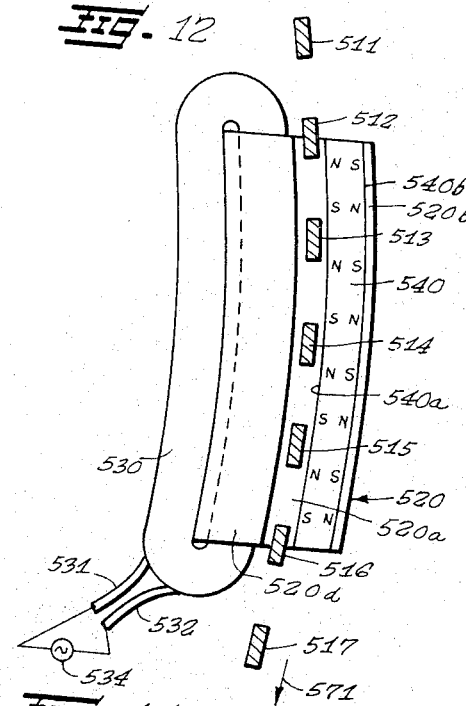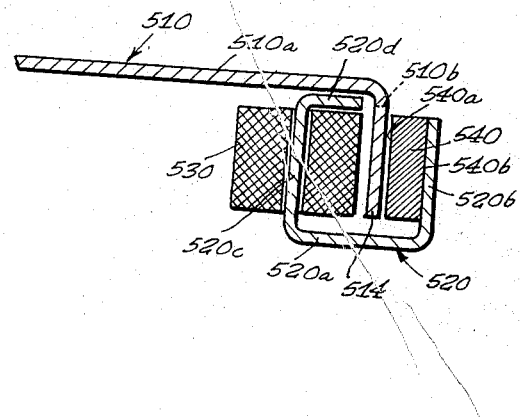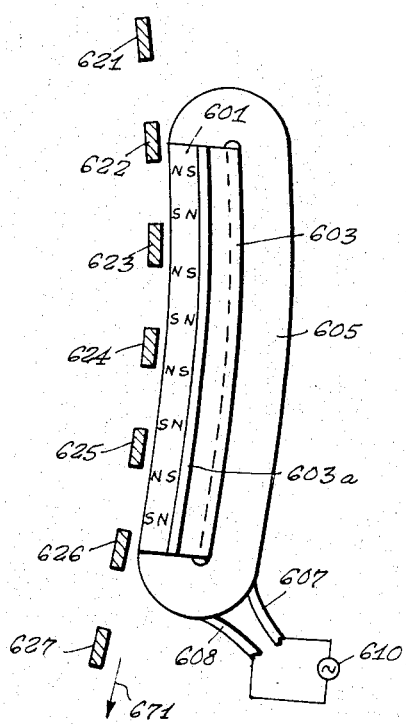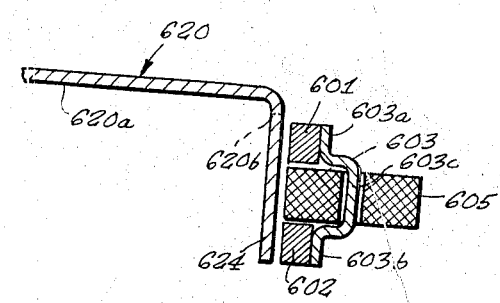

United States Patent Office 3,356,876
Patented Dec. 5, 1967

3,356,876
SYNCHRONOUS MOTOR
Richard A. Scholten, Chesterton, Ind., assignor to Indiana General Corporation, Valparaiso, Ind., a corporation of Indiana
Filed Apr. 5, 1960, Ser. No. 20,128
9 Claims. (Cl. 310—156)

This invention relates to electrodynamic machines and particularly to such machines which utilize permanent magnets to provide an operating magnetic field for the machine.

One series of embodiments of the present invention provide more efficient arrangements for synchronous motors such as used in clocks and timing devices. Conventional motors using permanently magnetized rotors have magnets with alternate poles around a given diameter and an electromagnetic field with instantaneous alternate poles on a slightly larger diameter around the permanent magnet rotor. The electromagnetic circuits in such conventional motors have a relatively high leakage flux which detracts from the motor performance. The present invention provides constructions which eliminate the high leakage flux of the conventional permanent magnet motors by using a loop electromagnetic circuit having a gap and having magnetizable material located at the respective ends of the gap and directly adajcent the permanent magnet material of the machine which is disposed in the gap. In one embodiment, for example, the electromagnetic poles are on different diameters and one or more permanent magnets with alternate poles are located directly between and directly adjacent the electromagnetic poles.

It is therefore an important object of the present invention to provide a permanent magnet type electrodynamic machine having greatly reduced leakage flux and correspondingly improved performance characteristics.

It is another object of the present invention to provide a synchronous motor having an output torque which is very substantially increased in comparison with the torque produced by a conventional motor of the same size.

Another object of the invention is to provide a permanent magnet motor construction which has a rotor of relatively low inertia.

A further object of the invention is to provide a synchronous motor of relatively small size and high efficiency and which may take a variety of forms depending on the application desired.

A still further object of the invention is to provide a permanent magnet type electrodynamic machine which is extremely simple and economical to manufacture.

Other objects, features and advantages of the present invention will be apparent from the following detailed description taken in connection with the accompanying drawings, in which:

FIGURE 5 is a vertical sectional view of a third modification of the present invention;

FIGURE 6 is a vertical cross sectional view taken along the line VI—VI of FIGURE 5;

FIGURE 7 illustrates a fourth embodiment of the present invention by means of a vertical longitudinal sectional view;

FIGURE 8 shows an end elevational view of the embodiment of FIGURE 7;

FIGURE 12 is a fragmentary horizontal sectional view illustrating a further embodiment of the present invention as applied to a timing motor using a large diameter rotor such as a turntable;

FIGURE 13 is a fragmentary vertical sectional view of the embodiment of FIGURE 12;

FIGURE 14 is a fragmentary horizontal sectional view of another embodiment of a timing motor utilizing a large diameter rotor; and FIGURE 15 is a fragmentary vertical sectional view of the structure of FIGURE 14.

As shown on the drawings:

Figure 1:
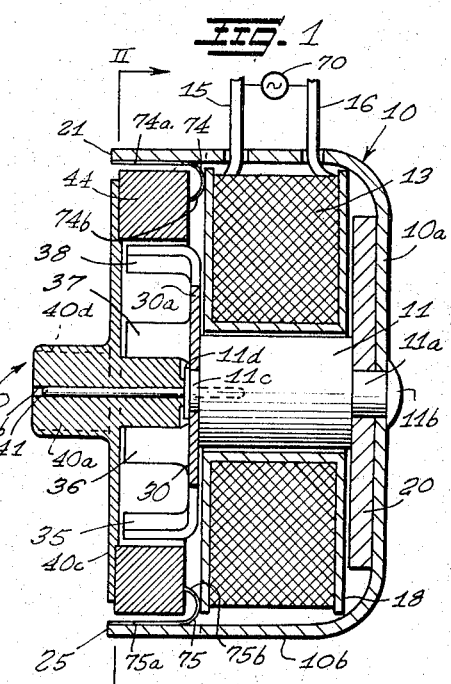
FIGURE 1 is a vertical sectional view of a first embodiment of the present invention which may be operated as a small synchronous motor.

FIGURE 1 illustrates an embodiment especially adapted to provide a relatively small motor with a high torque output. The motor comprises a generally cup-shaped casing 10 of magnetic material to which is secured to a core 11 of magnetic material. The core 11 is of cylindrical configuration and receives a winding assembly 13. The assembly comprises a helically wound coil of wire having leads 15 and 16 connecting to the opposite ends thereof and wound on a spool-like insulating bobbin 18. A plate member 20 of magnetic material is interposed between the winding assembly 13 and the end face 10a of the casing 10 and secured therewith by means of a reduced diameter extension 11a of magnetic material which extends through the plate 20 and through the end face 10a and is staked as indicated at 11b. The plate 20 serves to increase the cross sectional area of the magnetic flux path associated with the winding 13. The core 11 and plate 20 together with the end face 10a of the cup 10 have sufficient cross section to carry the maximum flux produced by the winding 11 without saturating. The cup 10 provides a series of fingers 21–28 extending integrally from a cylindrical portion 10b of the cup 10 to provide a series of outer pole portions of low retentivity magnetizable material. A spider member 30 is secured to the core 11 by means of a projection 11c of magnetic material which is staked as indicated at 11d. The spider member comprises a generally disk-shaped portion 30a and a series of axially directed extensions 31–38. The spider member 30 is of low retentivity magnetic material and the extensions 31–38 provide a series of pole portions spaced inwardly from the outer pole portions 21–28 and of instantaneously opposite magnetic polarity from the outer pole portions 21–28.

A rotor assemly 40 is mounted on a bearing pin 41 which is pressed into a receiving bore in core 11 and through a corresponding bore in the projection 11c of the core. The hub 40a of rotor 40 has a central bore 40b receiving the pin 41 with the rotor being freely rotatable on the bearing pin 41. The rotor member 40 is of non-magnetic material and further includes a radially extending portion 40c carrying an annular ring of permanent (high retentivity) magnet material 44 which may be glued or otherwise secured thereto. The hub portion 40a may have gear teeth such as indicated at 40d about the exterior periphery thereof for providing an output coupling from the motor. Any suitable means may be coupled to the gear teeth 40d for utilizing the output power from the motor. Such means may also serve to retain the rotor member 40 in proper axial relationship on the bearing pin 41.

As seen in FIGURE 1, the rotor permanent magnet ring 44 is disposed in the gap between the outer pole members 21–28 and the inner pole members 31–38 and the low retentivity electromagnetically energized pole members 21–28 and 31–38 are directly adjacent the permanent magnet material to provide a highly efficient electromagnetic circuit with low leakage flx. As indicated diagrammatically in FIGURE 2, the ring 55 is magnetized so as to have a series of magnetic poles of successively opposite polarity about the outer and inner peripheries thereof. At the radial sector portions 51, 53, 55, 57, 59, 61, 63 and 65 of the ring 44 there may be south poles at the inner and outer peripheries of the ring, while at radial sector portions 52, 54, 56, 58, 60, 62, 64 and 66 of the ring 44, there may be poles of north magnetic polarity at the inner and outer peripheries of the ring. This type of magnetization may be applied to the ring 44 by placing pole pieces in radial alignment with the successive radial sectors of the ring 44 at the inner and outer sides thereof and applying magnetomotive forces to the pole pieces such that the lines of force are directed radially into the ring, for example, at the sectors 51, 53, 55, 57, 59, 61, 63 and 65 and are directed radially away from the ring as the sectors 52, 54, 56, 58, 60, 62 and 66.

Figure 2:
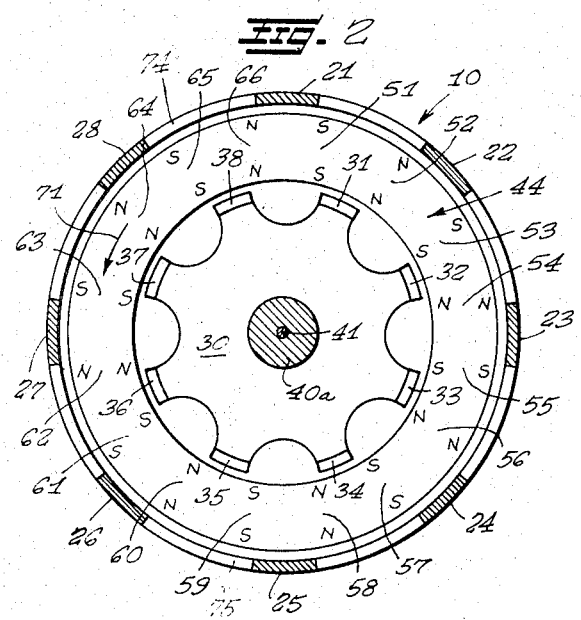
FIGURE 2 is a vertical cross sectional view taken generally along the line II–II in FIGURE 1.

For the embodiment shown in FIGURE 2 where there are eight outer pole members 21–28 and eight inner pole members 31–38, there may be sixteen successively oppositely magnetized radial sectors 51–66 on the ring 44 which are equally spaced about the circumference of the ring 44. If now, the winding 13 is energized from a suitable alternating current source such as indicated diagrammatically at 70 in FIGURE 1, in a given half cycle of the source 70 if the outer poles 21–28 have a north magnetic polarity while the inner poles 31–38 have a south magnetic polarity the permanent magnet ring 44 will tend to rotate in the counterclockwise direction as indicated by the arrow 71 in FIGURE 2. If, however, in the first half cycle of the source 70 the outer poles 21–28 had a south magnetic polarity and the inner poles 31–38 had a north magnetic polarity with the rotor 44 in the position shown in FIGURE 2, the rotor would tend to rotate in the clockwise direction. Suitable mechanical means may be provided allowing the rotor to rotate in only one direction, so that the rotor will always turn in the desired direction irrespective of the half cycle of the source 70 which is first applied to the winding 13.

In FIGURE 1, reference numerals 74 and 75 designate the notches between successive pole portions 21 and 28, and 25 and 26, respectively. The other successive pairs of pole portions have similar notches therebetween. The notches have relatively straight sides such as indicated at 74a and 75a and curved ends such as indicated at 74b and 75b.

Summarizing the operation of the embodiment of FIGURES 1 and 2, when the outer poles 21–28 are of north instantaneous magnetic polarity and the inner poles 31–38 of south instantaneous magnetic polarity, the permanent ring 44 begins rotating in the counterclockwise direction. by the time the source 70 reaches its next half cycle of operation, the magnet 44 will have rotated one pole position or 22½ degrees so that outer poles 21–28 now of instantaneous south magnetic polarity and the inner poles 31–38 now of north instantaneous magnetic polarity will continue to force the magnet 44 to rotate in the counterclockwise direction.

A motor was built in accordance with the embodiment of FIGURES 1 and 2 using an unoriented barium ferrite magnet approximately .875 inch inside diameter, 1.230 inches outside diameter and .187 inch in the axial direction, magnetized as indicated in FIGURE 1, except utilizing 18 poles at the inside diameter and at the outside diameter rather than 16 as shown in FIGURE 2. There were 9 outer poles and 9 inner poles to conform with the number of poles on the rotor. A running torque of approximately .8 ounce-inch was obtained. A test was also made with the inner and outer poles in radial alignment, that is with pole 21 in radial alignment with the pole 31 and so forth. With this arrangement approximately 30% less torque was obtained. The torque value of .8 ounce-inch is approximately ten times more torque than produced by a motor of the same size utilizing a conventional configuration.

Figure 4:
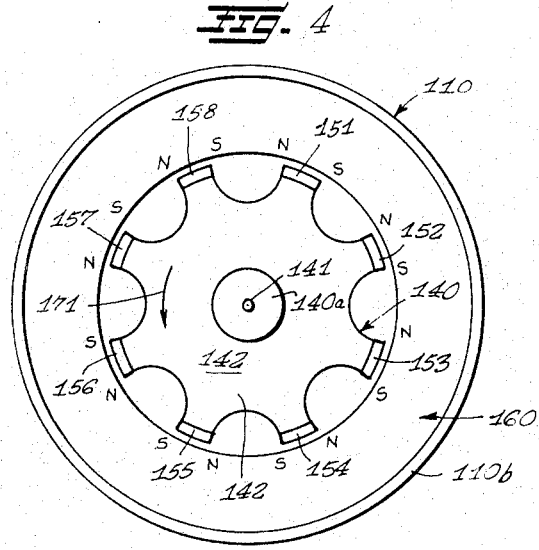
FIGURE 4 is an end elevational view of the embodiment of FIGURE 3.
Figure 3:
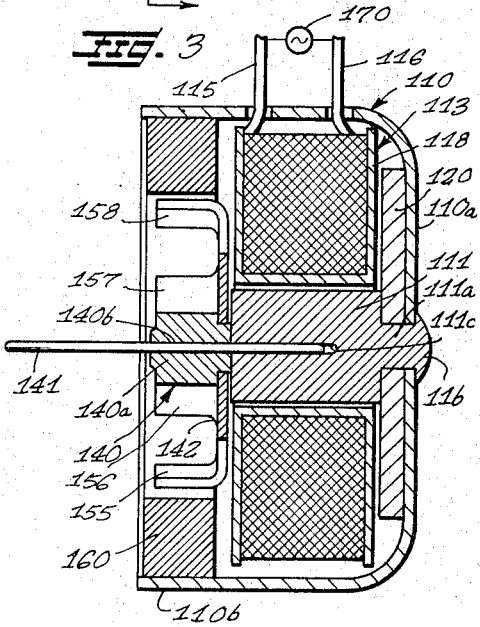
FIGURE 3 is a vertical sectional view illustrating a second embodiment of the invention which is adapted to provide a rotor of particularly low inertia.

FIGURES 3 and 4 illustrate a second embodiment of the present invention which provides a motor having a rotor of substantially lower inertia than the rotor of FIGURES 1 and 2. In this embodiment, a cup-shaped casing 110 of magnetic material has a cylindrical core 111 of magnetic material staked thereto by means of extension 111a and head portion 111b. A winding assembly 113 is mounted on the core 111 and has leads 115 and 116 connnecting therewith. The winding is carried on a spool-type insulating form 118. A plate 120 of magnetic material is interposed between the core 111 and the end 110a of casing 110. A rotor assembly 140 is mounted by means of a shaft 141. The rotor assembly comprises a hub 140a with an axial bore 140b receiving the shaft 141. The hub has secured thereto a spider 142 of magnetic material which is rotatable with the hub 140a and shaft 141 and has a series of low retentivity polar extensions 151–158. The hub portion 140a may be of magnetic material, and receives the shaft 141 in press fit relation, while central bore 111c in core 111 recives shaft 141 in rotatable relation so that the output power from the motor may be taken by means of the shaft 141.

The axially extending cylindrical portion 110b of casing 110 has a continuous periphery and has secured to the interior surface thereof a ring permanent magnet 160 which is magnetized as diagrammatically indicated in FIGURE 4. In this embodiment, the magnetization along the inner periphery of the magnet 160 consists of alternate north and south poles uniformly spaced about the inner circumference of the ring, with a north and south pole for each pole of the rotor member 142. In the illustrated embodiment there are eight poles 151–158 on the rotor member 42 and sixteen poles of alternate polarity equally spaced about the inner periphery of the permanent magnet member 160. Each pole about the inner perimeter of the magnet 160 may be produced by placing a pole piece in generally radial alignment with the region to be magnetized and applying a magnetomotive force to the pole pieces in the direction radially into the magnet 160 for the south poles and in the direction radially away from the magnet at the north poles, for example. The portion of the permanent magnet 160 radially outwardly of the inner perimeter may be generally randomly oriented so as to be substantially magnetically neutral.

It will be apparent that if a source 170 of alternating current is connected between the leads 115 and 116 and in its first half cycle causes the poles 151–158 to assume a south magnetic polarity with respect to the rim 110b of the casing 110 the rotor assembly 140 will begin rotation in the direction of the arrow 171 in FIGURE 4. Means may be provided if desired to prevent rotation of the member 142 in the opposite direction. The arrangement of FIGURES 3 and 4 has the advantage of providing a rotor with substantially lower inertia than the rotor of FIGURES 1 and 2. Thus the motor of FIGURES 3 and 4 will start more easily; on the other hand, the assembly of FIGURES 1 and 2 produces a higher output torque than the arrangement of FIGURES 3 and 4.

FIGURES 5 and 6 illustrate a motor having two rotary outputs. A casing 210 of magnetic material has a core 211 staked thereto by means of extension 211a and head 211b. A winding assembly 213 comprises helically wound electric coil having terminal leads 215 and 216 and an insulating spool-type winding form 218 mounted on the hub 211. As in the embodiment of FIGURES 1 and 2, the casing 210 has a series of polar extensions 221–229 in magnetic circuit relation with the core 211 which is linked by the winding 213. A first rotor assembly 230 comprises a hub portion 230a receiving a shaft 241 in pressed nonrotary relationship thereto, the shaft 241 being rotatable in a bore 211 in the core 211. Secured to the hub 230 is a spider portion 230b having a series of polar extensions 231–238. The hub portion 230a and the spider portion 230b may be of magnetic material to form part of of a loop magnetic circuit which further includes the cup 210, plate 220 and core 211.

A second rotor assembly 240 includes a hub portion 240a having a central bore rotatably receiving the shaft 241. The second rotor 240 includes a radially extending portion 240b to which is secured a permanent magnet ring 244. The first rotor assembly 230 and the second rotor assembly 240 are rotatable relative to the cup 210 and rotatable relative to each other. As best seen in FIGURE 6, the permanent magnet ring 244 has successively alternate pole portions about its outer periphery and about its inner periphery, the number of polar portions at the outer periphery being twice the number of polar extensions 221–229 and the number of pole portions about the inner periphery of the permanent magnet 244 being twice the number of polar extensions 231–238. Thus there are 18 polar portions equally spaced about the outer perimeter of the permanent ring 244 and 16 polar portions equally spaced about the inner periphery of the ring 244. The polar regions of the permanent magnet ring 244 are polarized magnetically in the same manner as described for example in connection with FIGURE 2 by placing a radially extending pole portion in alignment with each desired polar region and applying a magnetomotive force to create radially extending lines of force in the desired direction at each polar region. The letters N and S indicate the general locations of the regions of north and south magnetic polarity, respectively, about the inner and outer peripheries of the permanent magnet ring 244 in FIGURE 6. In each of the embodiments, the regions of north or south magnetic polarity are substantially uniform throughout the axial extent of the ring. The hub portion 240a may have gear teeth formed therein as indicated at 240c to provide a means for coupling to the motor assembly 240 to provide output torque from the motor. The shaft 241 may be coupled to any suitable output device to provide output torque from the rotor member 230. If source 270 provides 60 cycle alternating current to the winding 213, magnet 244 and its associated parts can rotate in either direction at 400 revolutions per minute. The inner spider portion 230b which has eight polar extensions 231–238 will rotate at 450 revolutions per minute with respect to the magnet. Thus, the first rotor assembly 230 may rotate at 850 revolutions per minute in the same direction as the second rotor 240 or at 50 revolutions per minute in the direction opposite to the second rotor assembly 240. Of course, various combinations of numbers of poles of the first and second rotors are possible to provide different relative speeds of the two output means 241 and 240c. Reference numerals 274 and 275 designate notches between pole portions 221 and 229, and 226 and 227, respectively.

FIGURES 7 and 8 illustrate a further embodiment of the present invention wherein a casing 310 of magnetic material has a cylindrical core 311 of magnetic material staked thereto by means of an extension 311a and head portion 311b. A winding assembly 313 includes an electric coil having leads 315 and 316 connected with the opposite ends thereof and the coil is mounted on a spool type insulating winding form of non-magnetic material 318. A plate 320 of magnetic material is carried by means of the extension 311a between the winding assembly 313 and the casing 311 and, as in the previous embodiments, serves to increase the cross-section of the magnetic circuit at the side of the core 311 remote from the rotor assembly.

The rotor assembly 330 of the motor comprises a spider member 330a having a series of polar extensions 331–338 integral with the magnetic material of the spider portion 330a. The rotor further includes a hub portion 340 having a central aperture 340a accommodating rotation of the rotor assembly on a bearing pin 341 which is press fitted into a receiving bore of the core 311. The rotor further includes a disk-like plate 350 of non-magnetic material having arcuate apertures receiving the ends of the polar extensions 331–338. The plate 350 carries a cylindrical shell of magnetic material 352 which has a series of polar extensions 361–368 projecting through conforming apertures in the plate 350 which thereby carries the shell 352 for rotation about the bearing pin 341. The inner end of the shell 352a extends in closely spaced relation to the axially extending end portion 310a of the casing 310 to provide a relatively low reluctance gap therebetween.

The winding form 318 carries a ring of permanent magnet material 344 which in this embodiment is stationary and is disposed radially between the polar extensions 331–338 and 361–368.

In the embodiment of FIGURES 7 and 8, if an alternating current source 370 is connected to the leads 315 and 316 and is in a half cycle where pole portions 361–368 are of instantaneous north magnetic polarity while pole portions 331–338 are of instantaneous south magnetic polarity, with the arrangement of polar portions on the permanent magnet 344 indicated in dash outline in FIGURE 8, the rotor assembly 330 including disk plate 350 will rotate in the clockwise direction indicated by the arrow 371 in FIGURE 8. The ring permanent magnet 344 has the same general arrangement of polar portions as the ring magnet 44 in FIGURE 2 and the permanent magnet poles may be created in the manner described in connection with FIGURE 2. In this embodiment, however, the permanent magnet 344 is stationary while spider member 330a is part of the rotor assembly and rotates relative to the permanent ring 344.

Figure 10:
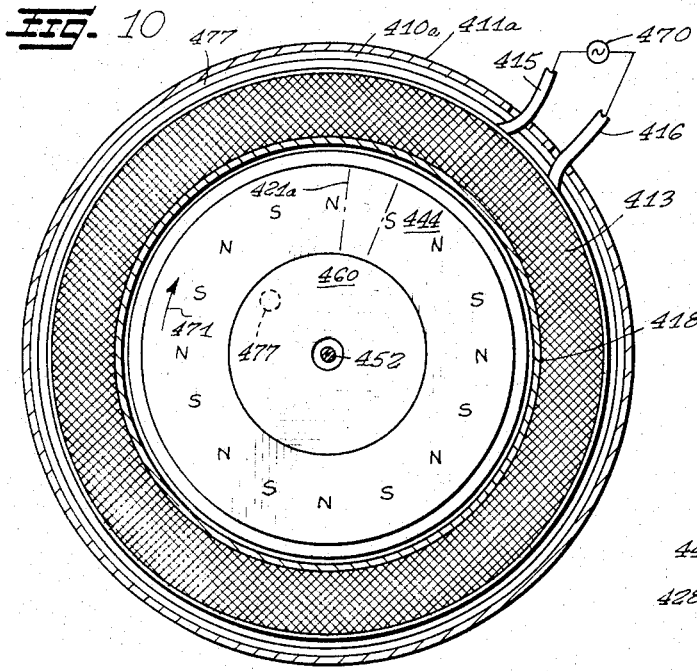
FIGURE 10 shows a vertical sectional view taken along the line X—X of FIGURE 9.
Figure 9:
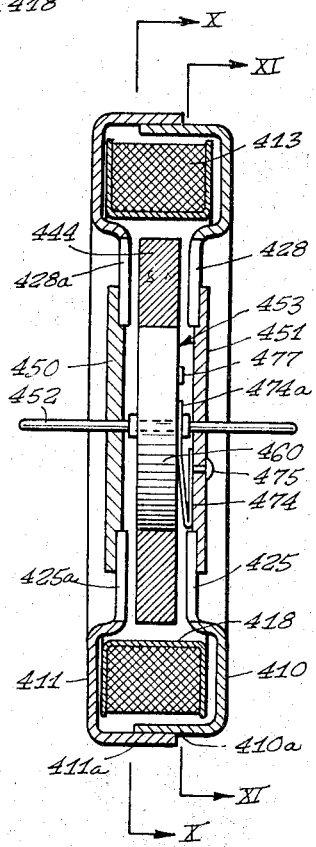
FIGURE 9 shows a vertical cross sectional view of a further embodiment wherein the electromagnetically energized poles are arranged on axially opposite sides of a permanent magnet rotor.
Figure 11:
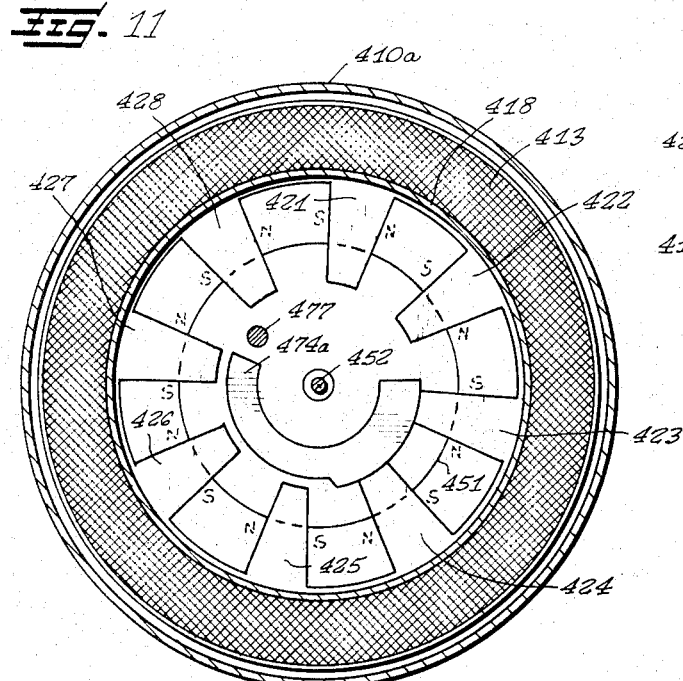
FIGURE 11 shows a vertical sectional view taken along the line XI—XI of FIGURE 9.

FIGURES 9, 10 and 11 illustrate a flat motor configuration having axial air gaps receiving a permanent magnet rotor. In this embodiment a pair of annular core parts 410 and 411 have axial portions 410a and 411a which overlap to define an interior space receiving a winding assembly 413 which is made up of a helically wound coil wound on an insulating spool-like coil form 418. Leads 415 and 416 connecting with the opposite ends of the coil are shown in FIGURE 10. It will be understood that the electric winding 413 tends to set up a generally toroidal magnetic field configuration which encircles the annular winding. The core parts 410 and 411 are of magnetic material and core part 410 provides a series of polar extensions 421–428 shown in FIGURE 11. Core part 411 has an equal number of axially aligned polar extensions such as 425a and 428a shown in FIGURE 9 and 421a indicated in FIGURE 10.

The rotor assembly is mounted by means of a pair of non-magnetic bearing plates 450 and 451 which mount the output shaft 452 secured to the rotor 453. The shaft 452 carries a central disk-like non-magnetic member 460 which in turn has an annular permanent magnet ring 444 secured to its outer perimeter. The permanent magnet 444 is thus disposed in the region of the axially extending air gap between the series of polar extensions 421–428 integral with core member 410 and the corresponding equal number of polar extensions integral with core member 411. The permanent magnet 444 has magnetized regions of successively opposite polarity at each of the opposite axial sides thereof. The disposition of permanent magnet polar regions is indicated diagrammatically in FIGURE 10 for the side of the magnet adjacent the polar extensions of core 411. For the case of eight polar extensions on each of core parts 410 and 411, a series of sixteen equally spaced poles of alternate magnetic polarity are provided on each axial side of the permanent magnet. As indicated diagrammatically in FIGURES 10 and 11, the polar portions on opposite sides of the permanent magnet 444 may be of opposite polarity and precisely axially aligned with each other, where the low retentivity polar portions integral with cores 410 and 411 are directly axially aligned and of the same number on each side of the permanent magnet. The permanently magnetized polar regions such as indicated in FIGURE 10 are produced by positioning an axially extending pole piece at each of the successive regions and applying a magnetomotive force to the pole pieces so as to produce lines of force extending in the axial direction and directed into the permanent magnet or away from the permanent magnet depending on the desired magnetic polarity. Output torque from the motor may be taken by means of the shaft 452.

In the case where the polar extensions such as 425 and 425a and 428 and 428a are directly axially aligned on respective opposite sides of the permanent magnet 444, the polar portions of the same magnetic polarity at the respective opposite axial sides of the permanent magnet 444 are offset with respect to each other one-half the distance between successive polar extensions of the cores 410 and 411. The position of the polar extension 421a which is integral with the core 411 is indicated diagrammatically in FIGURE 10 in dot dash outline and corresponds exactly to the position of the polar extension 421 in FIGURE 11. When the current source 470 energizes the polar extensions so that polar extension 421 is of north magnetic polarity and polar extension 421a (together with the other extensions integral with core 411 including polar extensions 425a and 428a) are of south magnetic polarity, the effect of both the polar extensions 421 and 421a, for example, will be to tend to rotate the permanent magnet 444 in the clockwise direction as indicated by the arrow 471 in FIGURE 10. The polarity of the polar regions on the right-hand axial side of the magnet 444 as seen in FIGURE 9 which is the side adjacent the polar extensions 421-428 is shown diagrammatically in FIGURE 11.

In the embodiment of FIGURES 9-11, a flat spring 474 is provided which is secured by means of rivet 475 to the stationary member 451 and slopes inwardly terminating in a free end 474a which would engage stop projection 477 on disk 460 in one direction of rotation of the rotor. However, for clockwise direction of rotation of rotor 453, the free end 474 will simply slide over the projection 477 and will have no appreciable retarding action on the speed of rotation of the rotor 453. This insures that the rotor will operate in the clockwise direction.

The embodiments of FIGURES 12 and 13, and 14 and 15 illustrate timing motor arrangements utilizing large diameter rotors. In FIGURES 12 and 13 circular disk-like turntable 510 has a series of depending extensions such as indicated at 511-517 uniformly spaced about the circumference thereof which travel successively through the working gap of a magnetic core arrangement 520. It will be understood that the turntable 510 may be of generally planar disk shape with an axis of rotation which is vertical in the orientation of FIGURE 13 and is located at the center of curvature of the series of polar extensions 511-517 shown in FIGURE 12. The core structure 520 comprises a generally U-shaped piece of magnetic material which as seen in FIGURE 12 may be curved slightly in the direction of travel of the polar extensions such as 511-517. The core member comprises a base 520a, upstanding legs 520b and 520c and an inturned polar portion 520d terminating generally at the level of the base portions of the successive polar extensions 511-517, the polar extensions 511-517 join the common disk portion 510a of the turntable as indicated at 510b in FIGURE 13. An electric winding 530 encircles leg portion 520c of the core and is energized by means of a pair of leads 531 and 532 connected to a source of alternating electric potential 534. A curved permanent magnet bar 540 is secured to the leg 520b of the core 520 and is illustrated as being disposed immediately adjacent the path of the successive polar extensions 511-517 on the turntable 510. The permanent magnet member 540 may have successive polar regions of alternate polarity at its face adajacent the path of the polar extensions 511-517 as indicated diagrammatically in FIGURE 12. The successive magnetic pole portions of the permanent magnet 540 are spaced a distance approximately one-half the spacing between the successive turntable polar extensions such as 511-517. The permanent magnet 540 may be magnetized by placing pole pieces at the sucessive polar regions on the respective opposite sides of the magnet bar, 540a and 540b, and applying a magnetomotive force to the pole pieces in such a direction as to create magnetic lines of force through the thickness dimension of the permanent magnet 540 in the direction to create a magnetic pole of one polarity along the vertical extent of surface 540a (as viewed in FIGURE 13), and a magnetic pole of opposite polarity along the vertical extent of surface 540b in the pattern indicated in FIGURE 12. Each north or south magnetically polarized region may be substantially uniform over the vertical extent of the surfaces 540a and 540d.

When the alternating current source is connected to leads 531 and 532, during the first half-cycle of the source the winding 530 may induce a magnetic flux in the core 520 in such a direction as to increase the strength of the north polar portions along the surface 540a of the permanent magnet 540 and to induce south poles in the successive teeth or polar extensions 511-517 of the turntable. This will cause the turntable to move in the clockwise direction as indicated by arrow 571 in FIGURE 12. During the next half cycle of the source, the south poles on the magnet bar 540 along surface 540a would be strengthened and the pole extensions 511-517 of the turntable would have a north magnetic polarity and the turntable would continue to move in the clockwise direction. As in the previous embodiments, rotation may start in either direction unless mechanical means are provided for preventing rotation in an undesired direction.

FIGURES 14 and 15 illustrate a further embodiment wherein two magnets 601 and 602 are secured to end portions 603a and 603b of a core part 603 of magnetic material and an electric winding 605 links a central portion 603c of the core part 603 and has a pair of leads 607 and 608 which may suitably be connected to a source 610 of alternating current. A turntable 620 has a series of equally spaced depending polar extensions such as indicated at 621-627 in FIGURE 14 about the circumference thereof successively arcuately traveling past the magnet assembly. The turntable 620 may comprise a disk like body portion 620a which is rotatable on an axis which is vertical in the orientation of the turntable shown in FIGURE 15 and located at the radius of curvature of the arrangement of extensions 621-627 shown in FIGURE 14. The successive polar extensions 621-627 join with the disk-like base portion 620a as indicated at 620b in FIGURE 15. In this embodiment, the two magnet bars 601 and 602 may have the same type of magnetic polarization as described in connection with FIGURE 12 except that the lower magnet bar 602 has south polar portions at regions vertically aligned with regions of north polarity for the bar 601 and north polarity regions vertically aligned with south polarity regions of the bar 601. Thus where the upper magnet 601 in the position of the turntable shown in FIGURE 14 has a north polar region closest to the polar extension 622 on the turntable, the magnet 602 would have a region of south polarity adjacent this same polar extension 622. The spacing of the polar regions of the upper and lower permanent magnets 601 and 602 are identical, the successive regions being equally spaced a distance equal to one-half the center-to-center distance between successive polar extensions of the turntable such as 621-627. If during the first half cycle of the source 610 winding 605 increases the strength of the north polar regions of the upper magnet 601 and the south polar regions of the lower magnet 602 which are adjacent the polar extensions 621-627, while the south polar regions of the upper magnet 601 and the north polar regions on the lower magnet 602 are substantially cancelled, the polar extensions such as 622–626 in FIGURE 14 will be pulled clockwise in the direction of the arrow 671 in FIGURE 14. During the next half cycle of the source 610, the opposite poles will be increased in strength and the turntable will be pulled another step in the clockwise direction equal to the center-to-center spacing between the successive polar extensions such as 621–627.

It will be understood that in FIGURES 12–15, the polar extensions such as indicated at 511–517 and 621–627 are of magnetizable material so as to be magnetically polarized as a result of the magnetomotive force applied by the winding 530 or 605.

In the embodiments of FIGURES 12 to 15, the windings could be associated with a turntable of magnetic material so as to induce poles of successively opposite polarity in the polar extensions such as 511–517 or 621–627, rather than associating the winding means with the permanent magnet stator assembly.

It will be understood that each of the materials heretofore described as magnetic are magnetically "soft" or low rententivity materials, except where a permanent magnet material (of high retentivity) is specifically called for. The permanent magnet material in each of the embodiments is preferably a ceramic permanent magnet material such as unoriented barium ferrite.

It will be apparent that numerous further modifications and variations may be made without departing from the scope of the novel concepts of the present invention.

I claim as my invention:

1. An electric motor comprising magnetic core means defining a magnetic circuit and having first and second series of magnetic pole portions arranged in circumferentially spaced relation about a longitudinal axis, said first series of circumferentially spaced pole portions being radially displaced from said second series of circumferentially spaced pole portions, electric winding means linking said magnetic circuit to generate a fluctuating magnetic flux therein, and a rotor of permanent magnet material mounted for rotation about said axis and having a series of radially displaced pre-magnetized pole portions extending in circumferentially spaced relationship adjacent each of said first and second series of pole portions, said pole portions of said core means and said rotor series of pole portions coacting to produce rotation of said rotor when said electrical winding means is energized to generate said fluctuating magnetic flux in said magnetic circuit.

2. An electric motor comprising magnetic core means defining a magnetic circuit and having first and second series of magnetic pole portions arranged in circumferentially spaced relation about a longitudinal axis, electric winding means linking said magnetic circuit to generate a fluctuating magnetic flux therein, and a rotor of permanent magnet material mounted for rotation about said axis and having a series of pre-magnetized pole portions extending in circumferentially spaced relationship adjacent each of said first and second series of pole portions, said pole portions of said core means and said rotor series of pole portions coacting to produce rotation of said rotor when said electrical winding means is energized to generate said fluctuating magnetic flux in said magnetic circuit, said first and second series of pole portions lying in a plane disposed generally at right angles to said axis and said first and second series of pole portions being disposed radially outwardly and radially inwardly of said rotor pole portions respectively.

3. An electrodynamic machine comprising a cup-shaped magnetic core having an end wall and a generally cylindrical portion concentrically disposed with respect to a central axis of said core and terminating in an open end remote from said end wall, a core portion of magnetic material extending from said wall along said central axis within said generally cylindrical portion, an electric winding encircling said core portion within said generally cylindrical portion, and means completing a magnetic circuit with said core and core portion, said magnetic circuit having a rotor member rotatable on said central axis of said core and disposed at the open end of said core and having permanently magnetized pole means radially inward of said cylindrical portion at said open end of said core, said magnetic circuit providing pole means arranged in a circular path about said center axis and radially inward of said permanently magnetized pole means and coupled with said winding for inducing magnetic poles of the same instantaneous magnetic polarity which interact with said permanently magnetized pole means to transduce energy between rotation of said rotor member and current flow in said winding.

4. An electrodynamic machine comprising a cup-shaped magnetic core having an end wall and a generally cylindrical portion concentrically disposed with respect to a central axis of said core and terminating in an open end remote from said end wall, a core portion of magnetic material extending from said wall along said central axis within said generally cylindrical portion, an electric winding encircling said core portion within said generally cylindrical portion, and means completing a magnetic circuit with said core and core portion, said magnetic circuit having a rotor member rotatable on said central axis of said core and disposed at the open end of said core and having permanently magnetized pole means at said open end of said core, said magnetic circuit providing pole means arranged in a circular path about said center axis and coupled with said winding for inducing magnetic poles of the same instantaneous magnetic polarity which interact with said permanently magnetized pole means to transduce energy between rotation of said rotor member and current flow in said winding, said rotor member carrying said permanently magnetized pole means radially inward of said cylindrical portion and said magnetic circuit pole means coupled with said winding being arranged in circumferentially spaced relation about said central axis and radially inwardly of said permanently magnetized pole means.

5. An electrodynamic machine comprising a cup-shaped magnetic core having an end wall and a generally cylindrical portion concentrically disposed with respect to a central axis of said core and terminating in an open end remote from said end wall, a core portion of magnetic material extending from said wall along said central axis within said generally cylindrical portion, an electric winding encircling said core portion within said generally cylindrical portion, and means completing a magnetic circuit with said core and core portion, said magnetic circuit having a rotor member rotatable on said central axis of said core and disposed at the open end of said core and having permanently magnetized pole means at said open end of said core, said magnetic circuit providing pole means coupled with said winding for interaction with said permanently magnetized pole means to transduce energy between rotation of said rotor member and current flow in said winding, said rotor member carrying said permanently magnetized pole means and said magnetic circuit pole means coupled with said winding being arranged in circumferentially spaced relation about said central axis and radially inwardly of said permanently magnetized pole means, and said core having a series of polar portions circumferentially spaced about said central axis radially outwardly of said permanently magnetized pole means.

6. An electromagnetic device comprising means defining a magnetic circuit, means defining a path for electric charge which path is inductively coupled to said magnetic circuit, said magnetic circuit defining means comprising magnetic core portions spaced apart and having a straight line path therebetween forming part of said magnetic circuit and permanent magnet means intersecting said straight line path and lying directly between said magnetic core portions, means mounting said magnetic core portions and said permanent magnet means to provide for relative movement between at least one of said magnetic core portions and said permanent magnet means, and means comprising cooperating magnetic poles of said permanent magnet means and of at least one of said magnetic core portions for transducing energy between a mechanical form as movement of said permanent magnet means relative to at least one of said magnetic core portions and an electrical form as flow of electric charge along said path coupled to said magnetic circuit.

7. An electromagnetic device comprising means defining a magnetic circuit, means defining a path for electric charge which path is inductively coupled to said magnetic circuit, said magnetic circuit defining means comprising two series of magnetic pole portions and permanent magnet means disposed between said two series of magnetic pole portions and having respective series of permanently magnetized regions adjacent the respective series of magnetic pole portions for interaction therewith, means mounting said series of magnetic pole portions and said permanent magnet means to provide for relative movement between said permanent magnet means and at least one of said series of magnetic pole portions, and means comprising the arrangement of the magnetic pole portions of said two series of magnetic pole portions relative to the respective series of magnetized regions of said permanent magnet means adjacent thereto providing for transducing of energy between an electric form as flow of electric charge along said path coupled to said magnetic circuit and a mechanical form as movement of said permanent magnet means relative to at least one of said series of magnetic pole portions.

8. The electromagnetic device of claim 7 wherein each series of magnetic pole portions comprise salient poles having the same instantaneous magnetic polarity for all salient poles of the same series.

9. The electromagnetic device of claim 8 wherein the radially inner series of salient poles bridge the space radially located between each of the salient poles of the radially outer series.

References Cited

UNITED STATES PATENTS

| | | | |
|---|---|---|---|
| 2,553,760 | 5/1951 | Gille | 310—164 |
| 2,572,632 | 10/1951 | Kurz | 310—164 |
| 2,997,611 | 8/1961 | Feiner | 310—164 |
| 3,059,131 | 10/1962 | Everard et al. | 310—156 X |
| 2,541,830 | 2/1951 | Phaneuf | 310—164 |
| 2,427,584 | 9/1947 | Welch | 310—164 |
| 1,967,782 | 7/1934 | Putnam | 310—164 |
| 1,966,897 | 7/1934 | Lofgren | 310—164 |
| 2,212,192 | 8/1940 | Howell | 310—156 |
| 2,677,776 | 5/1954 | Kohlhagen | 310—156 |
| 2,691,112 | 10/1954 | Clifford et al. | 310—156 |
| 2,794,137 | 5/1957 | Faus et al. | 310—156 |
| 2,864,018 | 12/1958 | Aeschmann | 310—154 |

ORIS L. RADER, *Primary Examiner.*

G. SIMMONS, *Assistant Examiner.*